(12) United States Patent
Nishimura

(10) Patent No.: US 6,618,458 B1
(45) Date of Patent: Sep. 9, 2003

(54) METHOD AND APPARATUS FOR SIGNAL RECEIVING SYNCHRONIZATION

(75) Inventor: Osami Nishimura, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/491,332

(22) Filed: Jan. 26, 2000

(30) Foreign Application Priority Data

Jan. 29, 1999  (JP) .......................................... 11-022319

(51) Int. Cl.⁷ ................................................ H04L 7/06
(52) U.S. Cl. ...................... 375/364; 375/366; 370/350; 370/510; 370/512
(58) Field of Search ................................ 375/142, 145, 375/149, 150, 354, 362, 364, 365, 366; 370/321, 324, 330, 337, 350, 503, 509, 510, 512, 513

(56) References Cited

U.S. PATENT DOCUMENTS 5,838,672 A  * 11/1998  Ranta .......................... 370/335
5,953,649 A  *  9/1999  Junell ......................... 455/404

FOREIGN PATENT DOCUMENTS

| EP | 601629 A2 | * | 6/1994 | ............. H04J/3/06 |
| EP | 0809377 | | 11/1997 | |
| EP | 1024624 A2 | * | 8/2000 | ........... H04L/7/027 |
| JP | 5-244210 | | 9/1993 | |
| JP | 7-307730 | | 11/1995 | |
| JP | 7-321769 | | 12/1995 | |
| JP | 8-262127 | | 10/1996 | |
| JP | 8-307408 | | 11/1996 | |
| WO | WO 99/00912 | * | 1/1999 | ........... H04B/1/707 |

* cited by examiner

Primary Examiner—Stephen Chin
Assistant Examiner—Dac V. Ha
(74) Attorney, Agent, or Firm—Dickstein, Shapiro, Morin & Oshinsky, LLP.

(57) ABSTRACT

A synchronization method for received sign and its apparatus capable of increasing accuracy of detection of a receiving signal, of estimating a frequency and of improving reliability in the synchronization of received signal are provided. A signal intensity detecting section is used to detect some peak values and timing values of signals obtained in a first frame and to store them into a memory. A signal extracting section is used to estimate timing, in a second frame, by obtaining a largest synthesized peak value in both frames from the peak value and timing value supplied by a timing estimating section. In a frame following the second frame, frequency data estimated based on a frequency estimating signal with an estimated timing and frequency data estimated based on a frequency estimating signal corresponding to the estimated timing in the frame following the second frame are synthesized and an estimated frequency error is obtained from the synthesized frequency data. The correlation between a synchronization word with its frequency corrected based on an estimated frequency error by a signal extracting and frequency correcting section and a known synchronization word is examined by a synchronization word correlating section and synchronization of a receiving signal is established by a timing estimating section.

15 Claims, 12 Drawing Sheets

METHOD AND APPARATUS FOR SIGNAL RECEIVING SYNCHRONIZATION

BACKGROUND OF THE INVENTION

1. Field of the Invention

The present invention relates to a method and apparatus for signal receiving synchronization and more particularly to the method and apparatus capable of providing the signal receiving synchronization by estimating timing and frequencies for synchronization with high accuracy even when communication lines are in a bad state.

2. Description of the Related Art

In a portable radio line of a mobile radio communication system and in a satellite radio line using a TDMA (Time Division Multiple Access) system, in order for a signal receiver to successfully receive sending information transmitted from a signal sender i.e., to establish good synchronization between them, it is necessary to match signal receiving timing and frequency of a signal receiving apparatus to those of signals to be received.

Therefore, conventionally, in order for the signal receiving apparatus to provide synchronization for receiving a signal fed from the sender, a multiplexed signal for synchronization contained in a control signal sent through a radio control channel is sent from the signal sender to the signal receiver. The multiplexed signal containing frames, each being composed of two or more slots (also referred to as "bursts"), contains a CCS (Common Channel Signaling) signal containing a synchronization word composed of several tens of symbols inserted in one slot and a frequency estimating signal inserted in the other slot (i.e., in any of slots other than the slot into which the CCS signal is inserted). Data for controlling is inserted into a part having no synchronization word in the CCS signal.

A peak value is obtained by taking a moving average of levels of signals received through the control channel in each of the frames of the control signal, and a time when a largest peak value occurs is defined to be the time when a rough timing estimation is achieved, i.e., to be the time when a receiving signal (frequency estimating signal) is detected.

Though the frequency estimating signal is obtained by detection of the receiving signal described above, it also means that the frequency estimating signal having the frequency of the control signal affected by the state of radio is propagated. The detected frequency estimating signal is converted into spectrum data by using FFT (Fast Fourier Transform) and an estimated frequency error (i.e., a difference between the frequency assigned to the control channel by the signal receiver and the frequency of the receiving signal) is calculated and, by using the estimated frequency error, the frequency of the synchronization word in the CCS signal contained in a predetermined slot in the frame is corrected. The correlation between the received signal with its corrected frequency and a synchronization word (i.e., pre-specified bit series) is examined over a predetermined range of the signal and whether the correlated value exceeds a predetermined threshold is observed in order to check the appropriateness of the rough estimating of timing. If the correlated value exceeds the threshold, it is defined that the synchronization is established, i.e., the time when a peak correlation value occurs is defined to be the time when the timing is provided between the receiver and the sender. This timing is used for demodulation by the receiver.

The conventional method in which signals received in only one frame are used for establishing synchronization can achieve a desired purpose if radio propagation is in a comparatively good state. However, if the state of radio propagation becomes worse than expected in the conventional method, larger errors occur in the detection of received signals, estimating of the signal frequency and the correlation, thus resulting in a decrease in the accuracy of the signal synchronization process. Accordingly, it is impossible for the conventional method to satisfactorily achieve the synchronization purpose as desired.

A synchronization method for received signals that may solve such a shortcoming as described above is disclosed in European Patent Application (EP 0 809 377 A2). By referring to FIG. 12, the synchronization method disclosed in the above European Patent Application is described below.

In this method, a multiplexed signal for synchronization is sent through a radio control channel from a signal transmitter to a signal receiver. The multiplexed signal having frame structure, each being composed of two or more slots (also referred to as "bursts"), contains a CCS (Common Channel Signaling) signal containing a synchronization word composed of several tens of symbols inserted in one predetermined slot and a frequency estimating signal in the other predetermined slot (i.e., in any of slots other than the slot into which the CCS signal is inserted).

A peak value is obtained by taking a moving average of levels of signals received through the control channel in each of frames of the control signal, and the time when a largest peak value occurs is defined to be the time when a rough timing estimation is achieved, i.e., to be the time when a receiving signal (i.e., frequency estimating signal) is detected. By using the roughly estimated timing, the receiving signal (i.e., frequency estimating signal) is detected. This rough estimating of the timing is performed in the signal receiving synchronization method disclosed in the European Patent Application as follows.

The measurement of peak values of signal levels obtained by taking a moving average of levels of signals received is performed on signals received in two frames (at Step SD1 in FIG. 12) and two or more peak values corresponding to each other are selected and, if a time interval between these peak values is appropriate, it is presumed that the timing for synchronization is provided by using the roughly estimated timing. With the use of this roughly estimated timing, in the same manner as in the conventional method, the receiving signal is detected (i.e. "Detected or not", at Step SD2).

When it is impossible to perform the rough estimating of the timing for synchronization and also impossible to detect the receiving signal (in the case of "Not Detected" at Step SD2 in FIG. 12), in the same manner as in the conventional method, the same processing as above is carried out on the next frequency assigned to the control channel (i.e. "To next CCS frequency", at Step SD3).

The frequency is estimated by the FFT-conversion of the frequency estimating signal obtained based on roughly estimated timing and by detecting the receiving signal (in the case of "Detected" at Step SD2). The estimating of this frequency is made in the method disclosed in the European Patent Application as follows. That is, the above estimating of the frequency is performed on signals received in two frames of the control signal in accordance with a carrier to noise ratio (C/N ratio). If the estimating of the frequency is made twice, resulting values are averaged to finally obtain the estimated frequency (i.e. "Estimating of frequency error", at Step SD4).

The frequency estimating error at the time of receiving signals is estimated and the frequency of the synchronization word in the CCS signal contained in the next slot is corrected by using the estimated above frequency error. Then, the correlation between the synchronization word with its frequency corrected and the synchronization word (synchronization word known to the signal receiver) set to the control channel from the signal receiver side is examined over a predetermined range of the signal (i.e. "Judgement of correlation between signals", at Step SD5).

By checking whether the peak correlation value exceeds a predetermined threshold value, a fine estimating is made instead of the rough estimating of the timing. If the peak correlation value described above exceeds the threshold value (in the case of "Large correlation value" at Step SD6), it is presumed that the synchronization between the receiver and the sender has been established, i.e., the time when the peak correlation value is obtained is considered to be the time when the timing for the signal receiving is provided (i.e. "Tracking", at Step SD7).

Moreover, if the peak correlation value does not exceed the predetermined threshold value (in the case of "Small correlation value" at Step SD6), in the same manner as in Step SD3, the same processing is performed on the next frequency assigned to the control channel (i.e. "To next CCS frequency", at Step SD8).

In the signal receiving synchronization method disclosed in the above European Patent Application, the appropriateness of the time interval is checked and, if it is appropriate, the time point when the peak value occurs is considered to be the roughly estimated value of the timing. In such methods for estimating the timing as above, when part of the signal is greatly attenuated by an influence of phasing and the like, it is impossible to make the exact estimate of the timing and there is an increasing possibility that the receiving signal (frequency estimating signal) is not detected. For example, there is a case where, though an appropriate peak value is undetected in the first frame out of two frames of the control signal, a peak value is detected in the second frame with the same timing with which the peak value has been undetected in the first frame.

Also, in the signal receiving synchronization method disclosed in the above European Patent Application, the estimating of the frequency is made by averaging frequencies of signals obtained in two frames. However, when the estimating of the frequency is made by averaging frequencies of signals obtained in two frames, if the frequency distribution in time sequence differs between frequencies of signals obtained in the first frame and in the second frame, probability of error in the estimating of frequencies can be increased accordingly. For example, let it be assumed that frequency data in the case without noise is {0, 0, 0, 3, 0, 0, 0, 0}, frequency data in the case with noise is {1, 1, 2, 4, 2, 1, 1, 1} in the first frame and is {1, 1, 2, 3, 1, 1, 2, 4} in the second frame and, when the frequency is to be estimated assuming that the frequency data in time sequence is 0, 1, 2, 3, 4, 5, 6, 7, if the frequency is to be averaged, the estimated frequency in the first frame is estimated to be "3", and the estimated frequency in the second frame is estimated to be "3.5". Thus, in the method disclosed in the above European Patent Application, the possibility of non-detection of the receiving signal and the probability of the error in estimating of frequencies are increased, causing a disadvantage of unsuccessful signal receiving synchronization when the communication lines are in a bad state, in particular.

SUMMARY OF THE INVENTION

In view of the above, it is an object of the present invention to provide a synchronization method for received signals and apparatus capable of increasing accuracy of detection of a receiving signal, of estimating of a frequency for synchronization and of improving reliability in the synchronization.

According to a first aspect of the present invention, there is provided the signal receiving synchronization method for establishing synchronization between a signal sender and a signal receiver based on a frequency estimating signal detected based on a predetermined number of peak values, in each frame of a control signal containing the frequency estimating signal and a synchronization word, obtained by taking a moving average of a train of the control signals sent from the signal sender to the signal receiver and based on the synchronization word detected following the frequency estimating signal, including steps of:

synthesizing peak values corresponding to each other in two frames in the control signal; and detecting the frequency estimating signal based on a largest synthesized peak value out of synthesized peak values.

In the foregoing, a preferable mode is one that wherein includes steps of:

detecting a candidate for the frequency estimating signal based on the largest synthesized peak value obtained by synthesizing peak values obtained in two frames, and detecting, based on the candidate for the frequency estimating signal, the frequency estimating signal corresponding to a candidate for the frequency estimating signal in a third frame existing after the two frames.

Also, a preferable mode is one wherein the candidate for the frequency estimating signal corresponding to the largest synthesized peak value in the third frame existing after the two frames of the control signal is detected by taking into account an amount of a shift in timing obtained by calculation of a correlation value in the third frame existing after the two frames if the correlation value between a detected synchronization word with its frequency corrected using an estimated receiving frequency error and a synchronization word set by a signal receiving synchronization apparatus and being known to the signal receiver is larger than a threshold value and by not taking into account the amount of a shift in the timing obtained by calculation of the correlation value in the third frame existing after the two frames if the correlation value is smaller than the threshold value.

According to a second aspect of the present invention, there is provided a signal receiving synchronization method for establishing synchronization between a signal sender and a signal receiver based on a frequency estimating signal detected based on a predetermined number of peak values, in each frame in a control signal containing the frequency estimating signal and a synchronization word, obtained by taking a moving average of a train of the control signals sent from the signal sender to the signal receiver and based on a synchronization word detected following the frequency estimating signal, including steps of:

detecting a largest synthesized peak value and a next largest peak value out of synthesized peak values obtained by synthesizing peak values, corresponding to each other, obtained in two frames in the control signal, detecting the frequency estimating signal for the largest synthesized peak value detected and the next largest synthesized peak value detected, and establishing synchronization between the signal sender and the signal receiver based on two frequency estimating signals detected and the synchronization word to be detected following two frequency estimating signals detected.

In the foregoing, a preferable mode is one that wherein includes steps of detecting, based on peak values corresponding to the largest synthesized peak value and the next largest synthesized peak value obtained in the third frame existing after the two frames in the control signal, the frequency estimating signals corresponding to each of both synthesized peak values and establishing synchronization between the sender and the receiver based on each of frequency estimating signals detected and the synchronization word to be detected following the frequency estimating signal detected in the third frame existing after the two frames in the control signal.

Also, a preferable mode is one wherein the peak value is smaller than the largest peak value and the next largest peak value obtained in a frame of the control signal and is a peak value obtained in a predetermined order from the largest peak value.

According to a third aspect of the present invention, there is provided a signal receiving synchronization apparatus for establishing synchronization between a signal sender and a signal receiver based on a frequency estimating signal detected based on a predetermined number of peak values, in each frame in a control signal containing the frequency estimating signal and a synchronization word, obtained by taking a moving average of a train of the control signals sent from the signal sender to the signal receiver and based on the synchronization word detected following the frequency estimating signal, including:

synthesizing means for synthesizing peak values, corresponding to each other, obtained in two frames of the control signal; and detecting means for detecting the frequency estimating signal based on a largest synthesized peak value out of synthesized peak values synthesized by the synthesizing means.

In the foregoing, a preferable mode is one that wherein includes first detecting means for detecting a candidate for a frequency estimating signal based on the largest synthesized peak value obtained in the two frames and second detecting means for detecting the frequency estimating signal corresponding to a candidate for the frequency estimating signal obtained in a third frame existing after the two frames based on a candidate for the frequency estimating signal detected by the first detecting means.

Also, a preferable mode is one wherein the first detecting means includes estimating means for a receiving frequency error based on the largest synthesized peak value detected in the two frames and candidate detecting means for detecting a candidate for the frequency estimating signal, if the correlation value between the detected synchronization word with its frequency corrected using the estimated receiving frequency error and the synchronization word set by the signal receiving synchronization apparatus and being known to the signal receiver is larger than a threshold value, by taking into account an amount of a shift in timing obtained by calculation of the correlation value in the third frame existing after the two frames and, if the correlation value is smaller than the threshold value, by not taking into account the amount of a shift in the timing obtained by calculation of the correlation in the third frame existing after the two frames.

Also, a preferable mode is one wherein the synthesizing means has a memory to store the peak value which is smaller than the largest peak value and the next largest peak value obtained in a frame in the control signal and which is a peak value obtained in the predetermined order from the largest peak value and wherein the synthesizing means is used to synthesize peak values stored in the memory and corresponding peak values obtained in a subsequent frame in the control signal.

According to a fourth aspect of the present invention, there is provided a signal receiving synchronization apparatus for establishing synchronization between a signal sender and a signal receiver based on a frequency estimating signal detected based on a predetermined number of peak values, in each frame in a control signal containing the frequency estimating signal and a synchronization word, obtained by taking a moving average of a train of the control signals sent from the signal sender to the signal receiver and based on the synchronization word detected following the frequency estimating signal, including:

first detecting means for detecting a largest synthesized peak value and a next largest synthesized peak value out of peak values obtained by synthesizing peak values, corresponding to each other, in two frames in said control signal;

second detecting means for detecting the frequency estimating signals corresponding to each of both the synthesized peak values based on the largest synthesized peak value and the next largest synthesized peak value detected by the first detecting means; and synchronizing means for establishing synchronization based on two frequency estimating signals detected by the second detecting means and a synchronization word detected following the two frequency estimating signals.

In the foregoing, a preferable mode is one that wherein includes third detecting means for detecting the frequency estimating signals corresponding to each of both synthesized peak values detected in the third frame existing after the two frames based on the largest synthesized peak value and the next largest synthesized peak value obtained in the third frame existing after the two frames and synchronizing means for establishing synchronization based on each of frequency estimating signals detected by the third detecting means and synchronization words detected in the third frame following the frequency estimating signal.

Also, a preferable mode is one wherein the first detecting means is provided with a memory to store the peak value which is smaller than the largest peak value and the next largest peak value obtained in a frame in the control signal and which is a peak value obtained in a predetermined order from the largest peak value and wherein the synthesizing means is used to synthesize peak values stored in the memory and corresponding peak values in a frame subsequent to the frame in the control signal.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
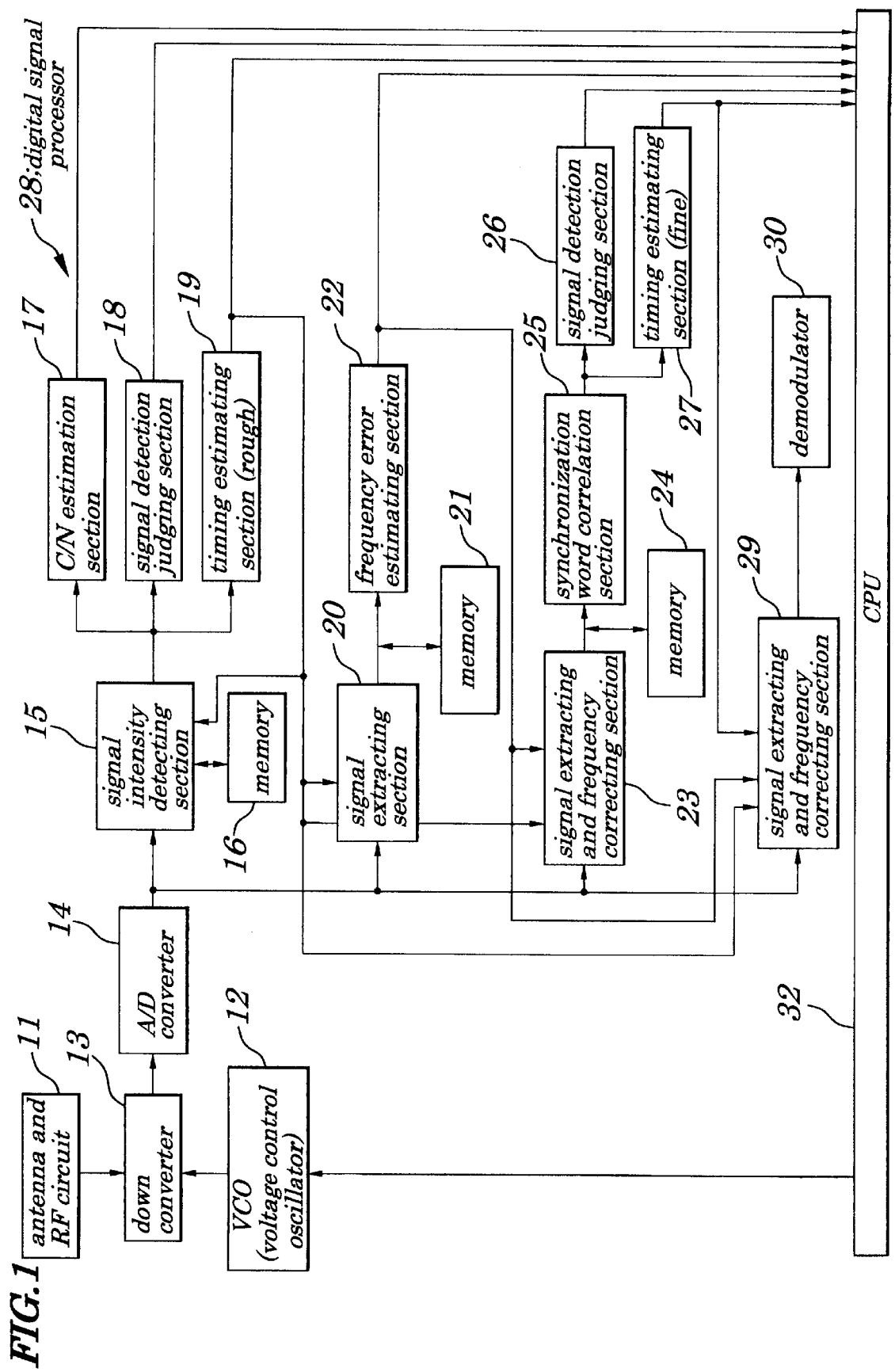
FIG. 1 is a block diagram showing electrical configurations of a signal receiving synchronization apparatus according to a first embodiment of the present invention.
Figure 2:
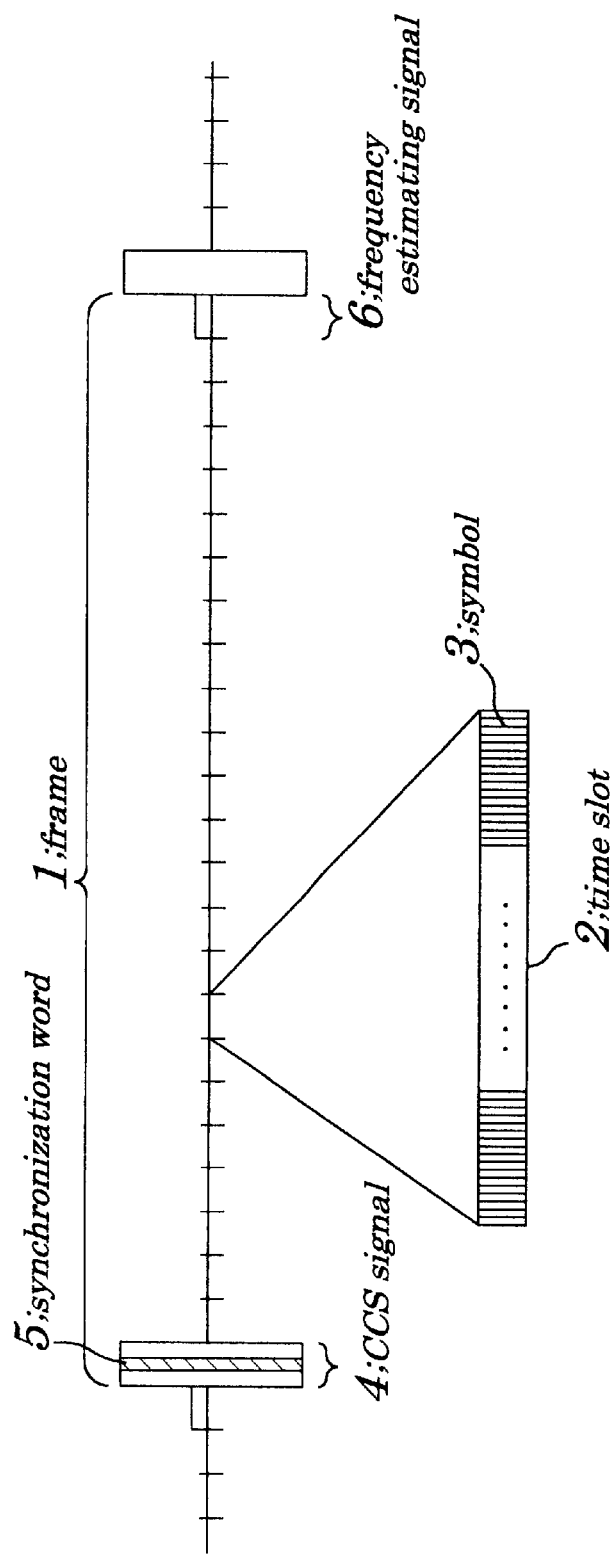
FIG. 2 is an illustration of configurations of a frame in a control signal to be received through a control channel from a sending device in the signal receiving synchronization apparatus of the first embodiment of the present invention.
Figure 3:
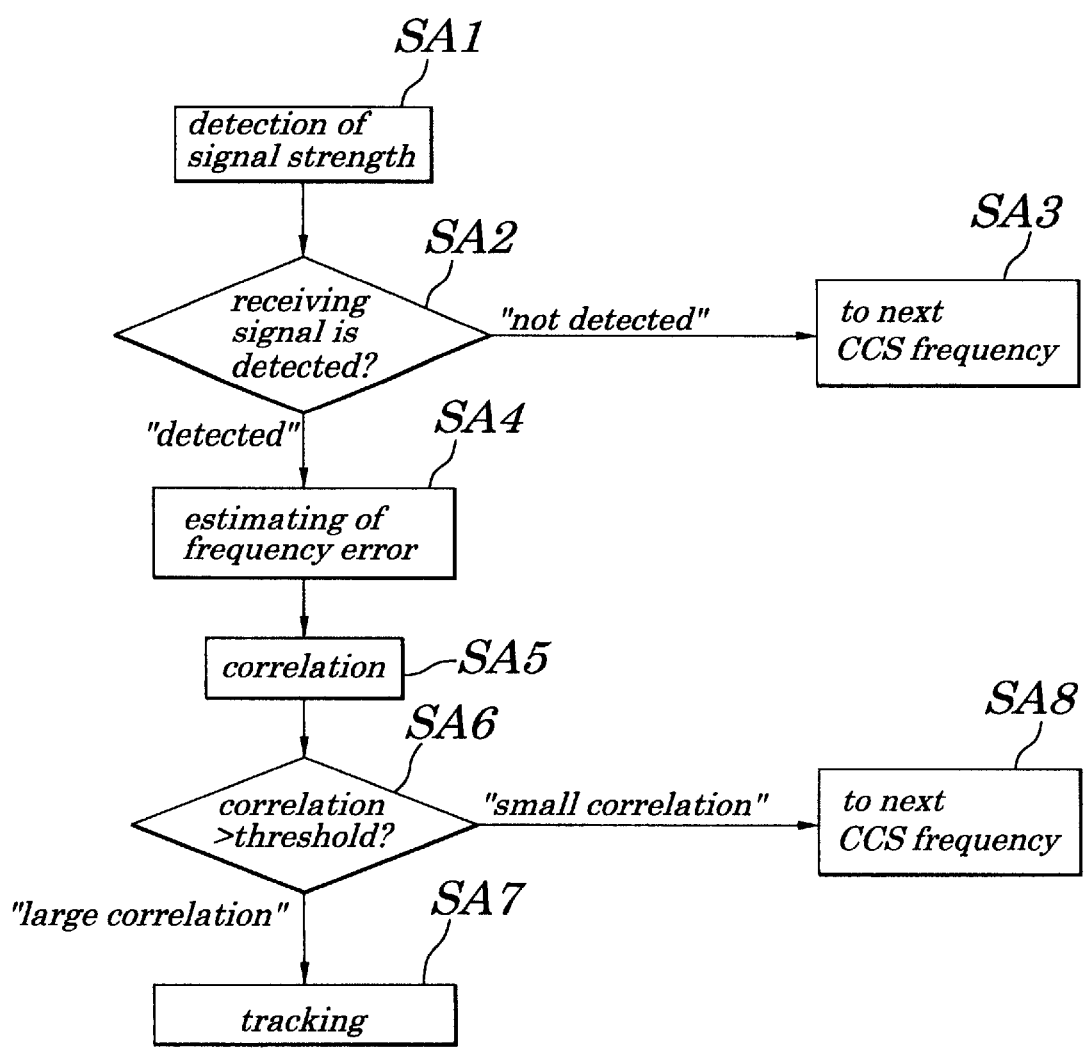
FIG. 3 is an approximate flowchart for carrying out procedures of signal receiving synchronization in the signal receiving synchronization apparatus of the first embodiment.
Figure 4:
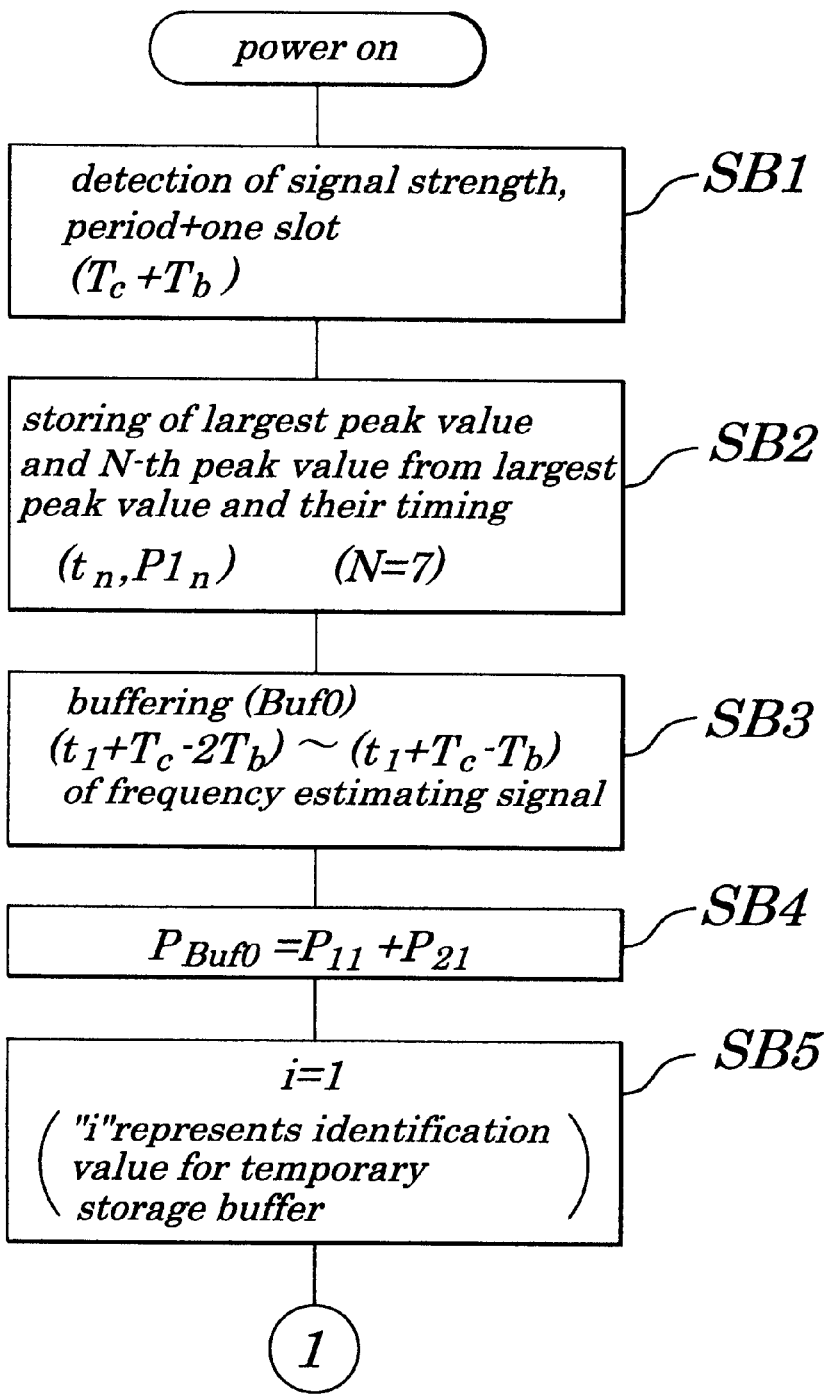
FIG. 4 is a first flowchart obtained by splitting the detailed flowchart into three parts for carrying out procedures of signal receiving synchronization in the signal receiving synchronization apparatus of the first embodiment.
Figure 5:
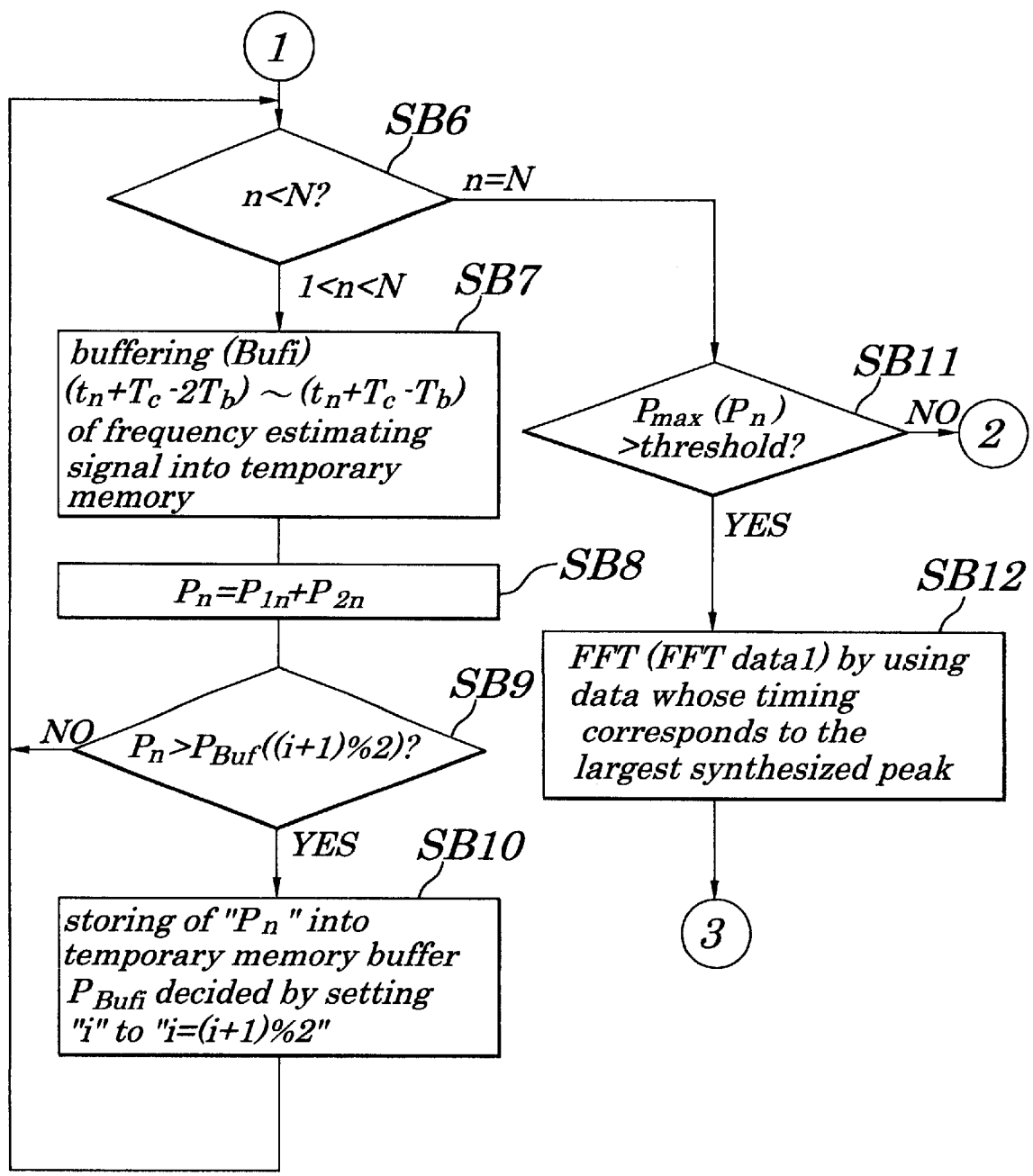
FIG. 5 is a second flowchart obtained by splitting the detailed flowchart into three parts for carrying out procedures of signal receiving synchronization in the signal receiving synchronization apparatus of the first embodiment.
Figure 6:
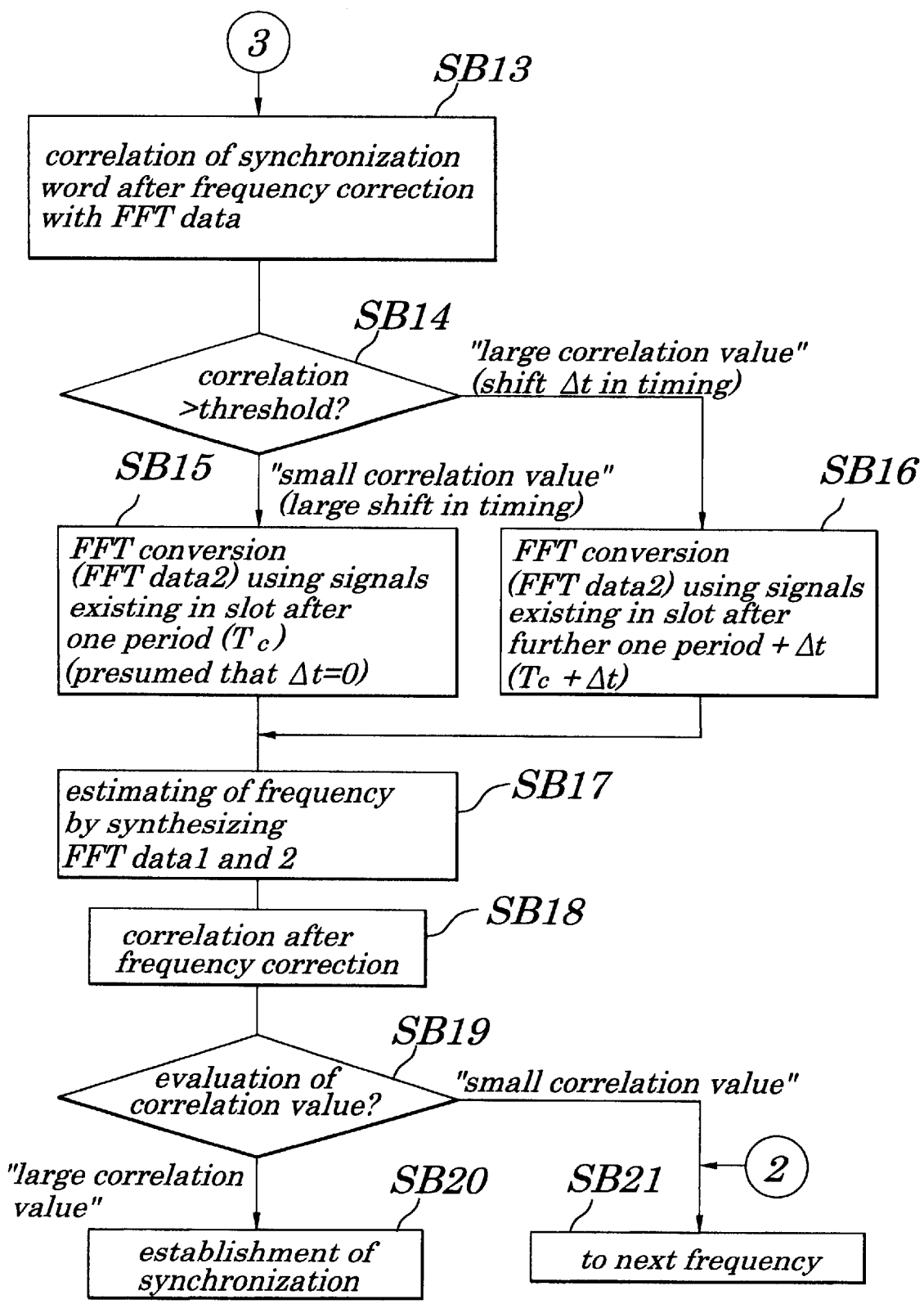
FIG. 6 is a third flowchart obtained by splitting the detailed flowchart into three parts for carrying out procedures of signal receiving synchronization in the signal receiving synchronization apparatus of the first embodiment.
Figure 7:
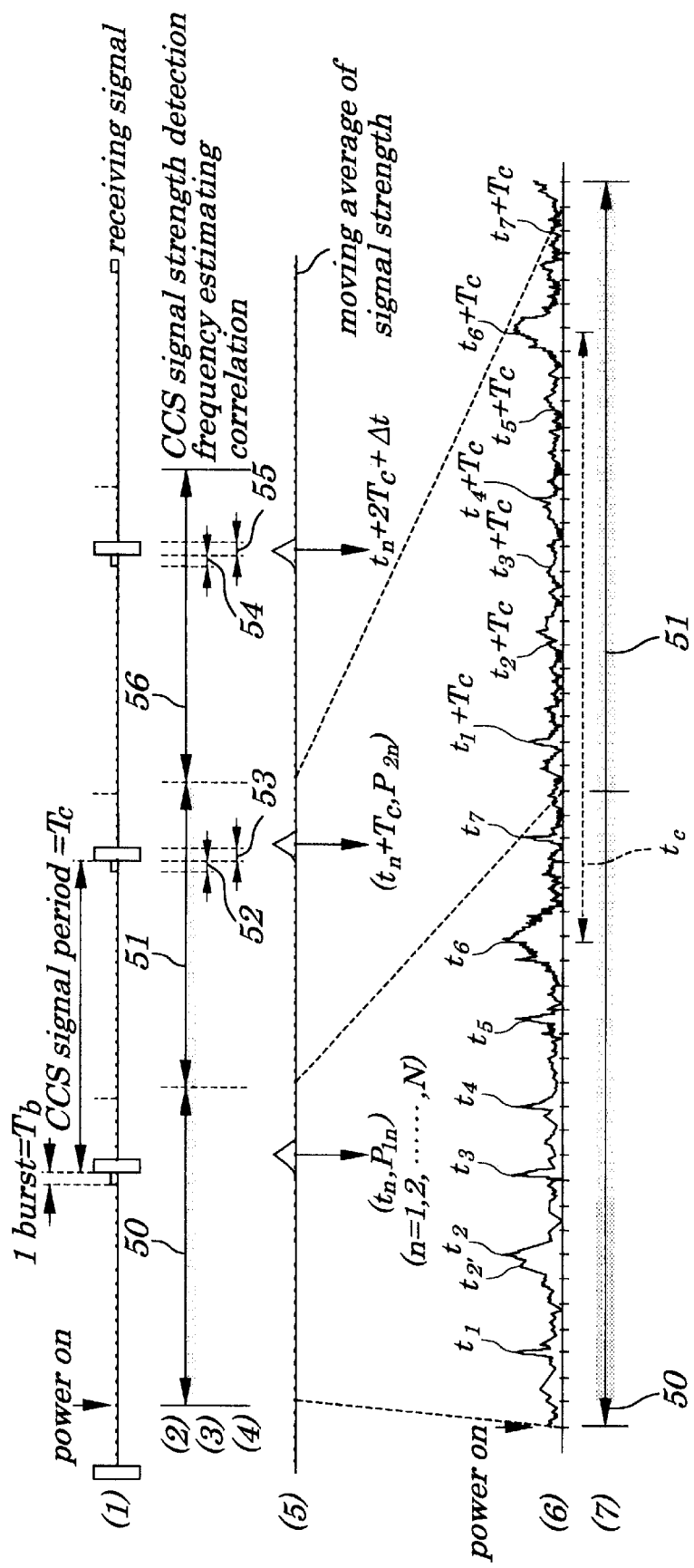
FIG. 7 is a timing chart showing signal receiving synchronization in the signal receiving synchronization apparatus of the first embodiment.
Figure 8:
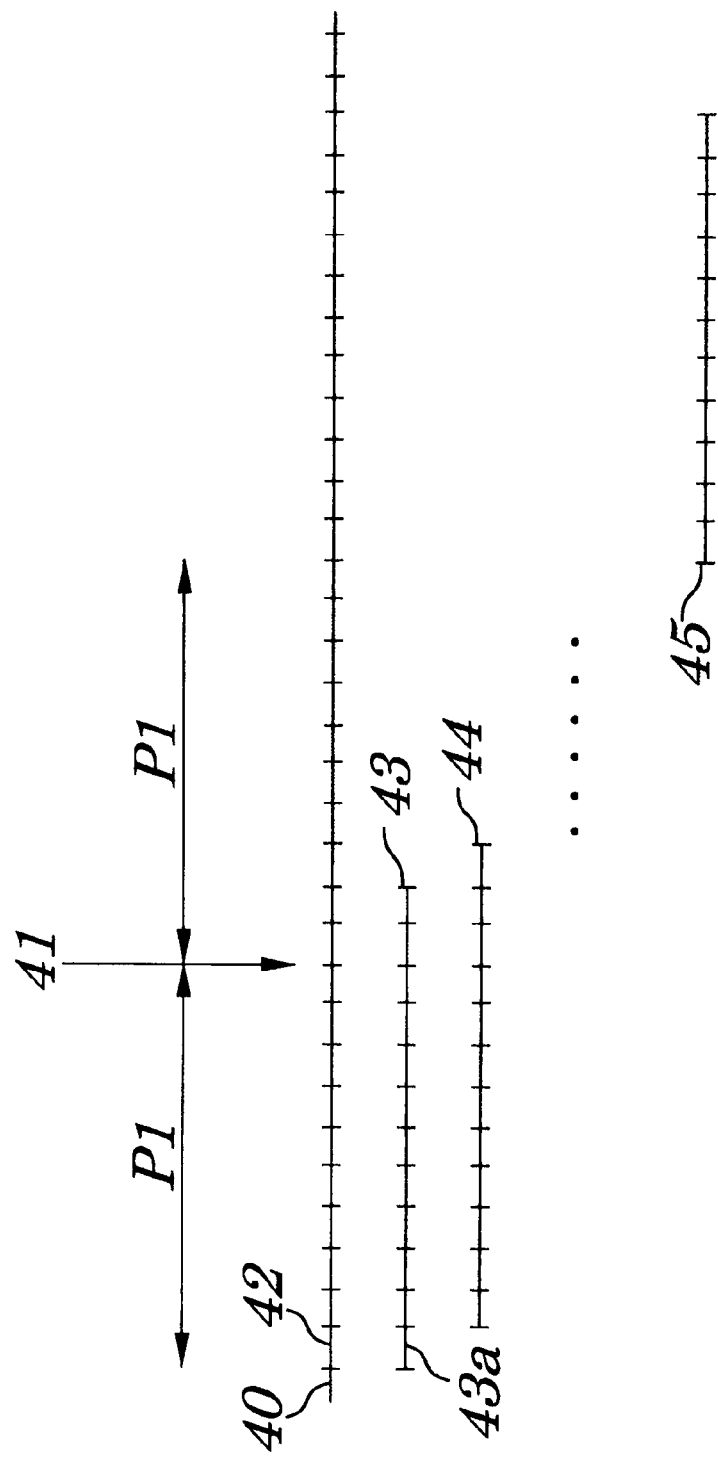
FIG. 8 is a diagram explaining a judgement of correlation between synchronization words in the signal receiving synchronization apparatus of the first embodiment.

FIG. 1 is a block diagram showing electrical configurations of a signal receiving synchronization apparatus according to a first embodiment of the present invention. FIG. 2 is an illustration of configurations of a frame in a control signal to be received through a control channel from a sending device in the signal receiving synchronization apparatus of the first embodiment. FIG. 3 is an approximate flowchart for carrying out procedures of signal receiving synchronization in the signal receiving synchronization apparatus of the first embodiment. FIG. 4 is a first flowchart obtained by splitting the detailed flowchart into three parts for carrying out procedures of signal receiving synchronization in the signal receiving synchronization apparatus of the first embodiment. FIG. 5 is a second flowchart obtained by splitting the detailed flowchart into three parts for carrying out procedures of signal receiving synchronization in the signal receiving synchronization apparatus of the first embodiment. FIG. 6 is a third flowchart obtained by splitting the detailed flowchart into three parts for carrying out procedures of signal receiving synchronization in the signal receiving synchronization apparatus of the first embodiment. FIG. 7 is a timing chart showing signal receiving synchronization in the signal receiving synchronization apparatus of the first embodiment. FIG. 8 is a diagram explaining a judgement of correlation between synchronization words in the signal receiving synchronization apparatus of the first embodiment.

As shown in FIG. 1, the signal receiving synchronization apparatus 10 of the first embodiment is an apparatus used to improve the detection accuracy of receiving signals and estimating accuracy of signal frequencies in order to implement reliable synchronization, including an antenna and RF(Radio Frequency) circuit 11, a frequency synthesizer (VCO) 12, a down-converter 13, an A/D (Analog Digital) conversion circuit 14, a signal intensity detecting section 15, a memory 16 connected to the signal intensity detecting section 15, a C/N (Carrier/Noise) judging section 17, a signal detection judging section 18, a timing estimating section 19, a signal extracting section 20, a memory 21, a frequency error estimating section (FFT) 22, a signal extracting and frequency correcting section 23, a memory 24, a synchronization word correlating section 25, a signal detection judging section 26 and a timing estimating section 27.

The above antenna and RF circuit 11 is adapted to output a radio frequency (RF) signal received by an antenna (not shown) or an intermediate frequency (IF) signal obtained by frequency-conversion of the radio frequency (RF) signal. The frequency synthesizer (VCO) 12 is used to feed a signal having a frequency assigned to a control channel to a down converter 13. The down-converter 13 is used to down-convert a signal fed from receiving devices such as the antenna by using the frequency of the signal fed from the frequency synthesizer 12 in order to produce a baseband signal and then the produced baseband signal is filtered and outputted. The A/D conversion circuit 14 is connected to the down-converter 13 and is adapted to A/D-convert the baseband signal. The signal intensity detecting section 15 is connected to the A/D conversion circuit 14 and is adapted to detect a peak value (i.e., a peak power level) of a level of a signal received. The memory 16 is used to store the peak value and its timing detected by the signal intensity detecting section 15. This memory 16 has two areas to be used as buffers "Buf0" and "Buf1". The C/N judging section 17 is used to judge a C/N (carrier-to-noise) ratio based on the peak value of a signal level detected by the signal intensity detecting section 15.

The signal detection judging section 18 is connected to the signal intensity detecting section 15 and is adapted to detect a signal by judging as to whether a CCS (Common Channel Signaling) signal is really contained in a control signal having a frequency assigned to a control channel being observed. The timing estimating section 19 is connected to both the signal intensity detecting section 15 and the memory 16 and is used to make a rough estimate of the timing. The signal extracting section 20 is connected to both the A/D conversion circuit 14 and the timing estimating section 19 and is used to extract a frequency estimating signal. The memory 21 is connected to the signal extracting section 20 and is adapted to store the extracted signal. This memory 21 also has two areas used as buffers "Buf0" and "Buf1" as in the case of the memory 16. The frequency error estimating section 22 is connected to the signal extracting section 20 and the memory 21 and is adapted to transform the frequency estimating signal by a FFT (Fast Fourier Transform) method to estimate the frequency error and then to output it.

The signal extracting and frequency correcting section 23 is connected to the A/D conversion circuit 14, a timing estimating section 19 and a frequency error estimating section 22, and is adapted to extract a synchronization word contained in the CCS signal and further to correct a frequency of the extracted synchronization word using the estimated frequency error outputted from the frequency error estimating section 22 and then to output synchronization word with its frequency corrected.

The memory 24 is connected to the signal extracting and frequency correcting section 23 and is adapted to store the synchronization word with its frequency corrected. The synchronization word correlating section 25 is connected to the signal extracting and frequency correcting section 23 and the memory 24 and is adapted to examine the correlation between the frequency-corrected synchronization word and those set by the signal receiving synchronization apparatus (i.e., synchronization words are already known in the signal receiving synchronization apparatus). The signal detection judging section 26 is connected to the synchronization word correlation section 25 and is adapted to detect a signal by judging from the correlation value as to whether the CCS signal is really contained in the control signal having a frequency assigned to the control channel being observed. The timing estimating section 27 is connected to the synchronization word correlating section 25 and is used to make a detailed estimate of the timing.

According to this embodiment, digital signal processor 28 includes a signal intensity detecting section 15, a C/N judging section 17, a signal detection judging section 18, a timing estimating section 19, a signal extracting section 20, a frequency error estimating section 22, a signal extracting and frequency correcting section 23, a synchronization word correlation section 25, a signal detection judging section 26, a timing estimating section 27 and a signal extracting and frequency correcting section 29.

Moreover, the signal detection judging section 18, the frequency error estimating section 22 and the signal detection judging section 26 are connected to a CPU (Central Processing Unit) 32. The CPU 32 is used to control the frequency of the frequency synthesizer 12 in accordance with the estimated frequency provided by the frequency error estimating section 22 in accordance with judgement results of the signal detection judging section 18 and the signal detection judging section 26 and to control switching the frequency to a next frequency of a signal assigned to the control channel when a largest synthesized peak value is smaller than a threshold value. The C/N judging section 17 connected to the signal intensity detecting section 15 and used to judge a carrier-to-noise ratio is further connected to the CPU32 for the purpose of judging the reliability of the frequency estimated value. The timing estimating section 19 and the timing estimating section 27 are connected to the CPU32 for the purpose of adjusting the timing of a time base mounted on the CPU32. The C/N judgement information from the C/N judging section 17 is configured so as to be fed to the CPU32, which means that the apparatus of the present invention can be used, in particular, when the C/N ratio is not satisfactory. Moreover, a demodulator 30 connected to the signal extracting and frequency correcting section 29 also connected to the A/D conversion circuit 14 and the frequency error estimating section 22, which is used to perform demodulation of signals received, is not directly related to this embodiment of the present invention.

Signal receiving synchronization procedures shown in the flow chart in FIGS. 4 to 6 are stored in a ROM (Read Only Memory) constituting the digital signal processor 28, which are read from the ROM and fed to a memory (RAM) (Random Access Memory) of the digital signal processor 28 and are performed by the digital signal processor 28, to carry out each of processing for the signal receiving synchronization by the signal intensity detecting section 15, the signal detection judging section 18, the timing estimating section 19, the signal extracting section 20, the frequency error estimating section 22, the signal extracting and frequency correcting section 23, the synchronization word correlation section 25, the signal detection judging section 26 and the timing estimating section 27.

A Step SA1 in FIG. 3 corresponds to Steps SB1 to SB10 and a Step SA2 in FIG. 3 corresponds to a Step SB11 in FIG. 5. Steps SA3 and SA8 correspond to a Step 21 in FIG. 6. A Step SA4 in FIG. 3 corresponds to a Step SB12 in FIG. 5 and Steps SB15 to SB17 in FIG. 6. A Step SA5 in FIG. 3 corresponds to Steps SB13 and SB18 in FIG. 6. A Step SA6 in FIG. 3 corresponds to Steps SB14 and SB19 in FIG. 6. A Step SA7 in FIG. 3 corresponds to a Step SB20 in FIG. 6.

The processing of the Step SB1 in FIG. 4 is performed by the signal intensity detecting section 15 in FIG. 1 and the processing of the Step SB2 in FIG. 4 by the signal intensity detecting section and the memory 16 in FIG. 1. The processing of the Steps SB2, SB3 and SB5 in FIG. 4 and of the Step SB10 in FIG. 5 are carried out by the timing estimating section 19 in FIG. 1. The processing of the Step SB4 in FIG. 4 is carried out by the memory 16 in FIG. 1. The processing of the Steps SB3 and SB7 in FIG. 4 is carried out by the signal extracting section 20 which is adapted to perform the processing in accordance with an output from the timing estimating section 19 in FIG. 1. The processing of the Step SB11 in FIG. 4 is carried out by the signal detection judging section 18 in FIG. 1. The processing of the Step SB12 in FIG. 5 and Steps SB15 to SB17 in FIG. 6 is carried out by the frequency error estimating section 22 in FIG. 1. The processing of Steps SB13 and SB18 in FIG. 6 is carried out by the signal extracting and frequency correcting section 23 and the synchronization word correlation section 25 in FIG. 1. The processing of the Steps SB14 and SB19 is performed by the signal detecting judging section 26 in FIG. 1.

Next, operations of the processing of this embodiment are described by referring to FIGS. 1 to 8.

The control signal composed of two or more frames is sent through the control channel from a signal sending device to the signal receiving synchronization apparatus. One frame of the control signal having two or more slots (also referred to as "bursts"), each slot being composed of a plurality of symbols 3 (FIG. 2), contains a CCS symbol 4 containing a synchronization word 5 composed of several tens of symbols in one predetermined slot and a frequency estimating signal 6 in the other predetermined slot in a multiplexed state.

A signal sent through the control channel is received by the antenna and RF circuit 11. The radio frequency signal (RF signal) or the intermediate frequency signal (IF signal) outputted from the antenna and RF circuit 11 (FIG. 1) is converted by the down converter 13 to the baseband signal and then inputted to the A/D conversion circuit 14.

As shown in FIG. 7, in serial frames of signals digitized by the A/D conversion circuit 14 (reference no. 1 in FIGS. 2 and 7), a peak value including values from the largest peak value to the N-th peak value (N=1, 2, . . . , n), out of peak values of signals obtained by taking a moving average of peak values of signal levels while a frame window (not shown in FIG. 7) having a predetermined length is being moved, (which shows one slot time length or time being a little shorter than the slot time) and their timing values, are obtained by the signal intensity detecting section 15, (Steps SB1 and SB2 in FIG. 4). FIG. 7 is an example in which N=7. A line shown in reference number 5 shows a signal obtained by taking a moving average of the signal strength when the signal received has not picked up noise. A line shown in reference number 6 shows a signal obtained by taking a moving average of the signal strength when the signal received has picked up noise. A line shown in reference number 7 shows that its cross-hatched portion is a period during which the peak value is to be observed.

Whenever the peak value and its timing value in a first frame (i.e., a period 50 shown in reference number 2 in FIG. 7) are obtained sequentially by the signal intensity detecting section 15 (Step SB1 in FIG. 4), both of them are stored in a buffer BufA of the memory 16 (Step SB2).

In the second frame (i.e., a period 51 shown in reference number 2 in FIG. 7) subsequent to the first frame, a first (n=1) peak value $P_{11}$ and its timing value are read from the BufA of the memory 16 and fed to the signal extracting section 20, and a frequency estimating signal is extracted and then stored in a buffer Buf0 of the memory 21 (Step SB3). A peak value $P_{21}$ supplied by the timing estimating section 19 and the peak value $P_{11}$ stored in the buffer Buf0 of the memory 16 are synthesized and stored in the buffer Buf0 of the memory 16 (Step SB4). The above processing performed on the first peak values in the first and second frames is carried out on the second to seventh peak values in the first and second frames (Steps SB6 to SB10).

Every time the processing on the third peak value is performed, the synthesized $P_n$ ($P_n=P_{1n}+P_{2n}$ (n=3, 4, ..., 7) is compared with the peak value $P_{Buf[(i+1)\%2]}$ which is stored in either of the buffer Buf0 or Buf1 of the memory 16, wherein, for example, if i=1 (i.e., "i" is set to 1), "$_{Buf[(i+1)\%2]}$" represents the buffer number Buf0 and the symbol "%" represents a modulo operator, and when the synthesized $P_n$ is larger than the peak value $P_{Buf[(i+1)\%2]}$, the $P_n$ is stored in other buffer not storing the larger peak $P_{Buf[(i+1)\%2]}$. In the subsequent loop processing, the $P_n$ is stored in the buffer being different from the above buffer. This means that switching between two buffers is made. When n>7 (in the case of "n>N" at Step SB6), a largest peak value out of seven peak values given if N=7, is represented as "max (Pn)" in this embodiment wherein Pn is one example out of these peak values and there are seven peak values in this example. That is, in this embodiment, a judgement as to whether the max ($P_n$) (=$P_6$) is larger than a predetermined threshold value is made by the signal detection judging section 18 (Step SB11) and when the largest peak value max ($P_n$) is smaller than the predetermined threshold value (in the case of "NO" in Step SB11), the same processing is performed on a next frequency assigned to the control channel at Step SB21 in FIG. 6. Before the largest peak value max ($P_n$) is judged to be larger than the predetermined threshold value (in the case of "YES" at Step SB11 in FIG. 5), data composed of signals for estimating frequency at the timing (on the slot) of its largest peak value max($P_n$) are already stored in the memory 21, and then the data are FFT(Fast Fourier Transform)—converted by the frequency error estimating section 22 to obtain estimated frequency errors (FFT data 1) (Step SB12 in FIG. 5). After that, the estimated frequency errors are supplied to the signal extracting and frequency correcting section 23.

The signal extracting and frequency correcting section 23 is adapted to extract a synchronization word contained in the CCS signal existing in a slot (i.e., a period 53 in the reference number 4 in FIG. 7) subsequent to a slot shown at the timing outputted by the timing estimating section 19 over a predetermined range of signals (i.e., the range of P1 in FIG. 8) existing before and after the synchronization word, and the frequency of synchronization words extracted using the estimated frequency error fed from the frequency error estimating section 22 is corrected and the synchronization word with its frequency corrected is stored in the memory 24. The synchronization word correlation section 25 is used to examine the correlation between the synchronization word with its frequency corrected stored in the memory 24 and a synchronization word contained in the signal to be sent through the control channel, which is set by the signal receiving synchronization apparatus, over a predetermined range of signals to output the degree of the correlation and a shift in timing Δt (Step SB13).

Moreover, the reference number 41 in FIG. 8 shows the timing roughly estimated based on by the detection of strength of signals received. The reference number 40 shows an extension in time sequence of part of the synchronization word stored in the memory 24 and the reference number 42 shows its starting position. The numbers 43, 44, ..., 45 show part of the synchronization word expressed as the reference number 40 for arithmetic operations of the correlation and the number 43a shows its starting position.

In this embodiment, frequency errors are estimated to examine the correlation between the synchronization words using signals in another one frame (i.e., aperiod 56 shown by the reference number 2 in FIG. 7.). If the degree of the correlation examined by the above processing is small (in the case of Small correlation value at Step SB14), the frequency estimating signal for a period following one period (period Tc of the CCS signal) is extracted and stored in the memory 21, and the stored frequency estimating signal is FFT-converted by the frequency error estimating section 22 and an estimated frequency error (FFT data 2) is obtained by the frequency error estimating section 22 (Step SB15). If the degree of the correlation examined by the above processing is large, i.e., if the reliability of Δt is high, the frequency estimating signal for a period (i.e., a period 54 shown in the reference number 3 in FIG. 7) following one period+Δt is extracted and stored in the memory 21, and the stored frequency estimating signal is FFT-converted by the frequency error estimating section 22 and an estimated frequency error (FFT data 2) is obtained by the frequency error estimating section 22 (Step SB16).

The estimated frequency error (i.e., the estimated frequency error obtained at Steps SB15 or SB16) obtained by synthesizing the frequency error (FFT data 2) already estimated in the above procedure and the frequency error estimated in a frame by one before the frame in which the estimated frequency error has been obtained is outputted from the frequency error estimating section 22 to the signal extracting and frequency correcting section 23 (Step SB17).

The signal extracting and frequency correcting section 23 is used to extract the synchronization word contained in the CCS signal (slot 55 in FIG. 5) in a slot existing 2Tc after the slot subsequent to a slot shown at the timing outputted from the timing estimating section and used to correct a frequency of the synchronization word extracted based on an estimated frequency error supplied by the signal extracting and frequency correcting section 23 and then the frequency-corrected synchronization word is stored in the memory 24.

The synchronization word correlation section 25 is adapted to examine the correlation between synchronization words, after their frequencies are corrected, stored in the memory 24, and those (synchronization words known to the receiver) contained in the control signal sent through the control channel which is set by the signal receiving synchronization apparatus and to output the resulting degree of synchronization, over a predetermined range of signals (Step SB19 in FIG. 6).

When the degree of the correlation exceeds the threshold value (in the case of "Large correlation value" at Step SB19 in FIG. 6), the time point (timing) when the degree of the correlation exceeds the threshold value is considered as a time point where the timing of the signal is set so as to be matched to the timing of the signal given by the signal sender; thus, the synchronization at the receiver side is established by making the timing of the receiver matched with the timing of the signal given by the signal sender (Step SB20).

Moreover, after this synchronization is established, the signal extracting and frequency correcting section 29 is used to extract controlling data in the CCS signal contained of the signal in a slot existing 2Tc after the slot subsequent to a slot shown by timing outputted from the timing estimating section 19, and to correct the frequency of controlling data contained in the CCS signal extracted by the estimated frequency error supplied by the frequency error estimating section 22. The demodulator 30 is used to perform demodulation of controlling data to be outputted from the signal extracting and frequency correcting section.

Furthermore, if the correlation value does not exceed a predetermined value (in the case of "Small correlation value" at Step SB19 in FIG. 6), as in the case of Step SB11, the same processing as above is made on the next control channel (Step SB21).

Thus, according to this embodiment, since the timing is provided by synthesizing peak values which correspond to each other, out of peak values obtained by taking the moving average of peak values of signal levels appearing between two frames and by extracting the frequency estimating signal using the largest synthesized peak value, memory capacity required to obtain the timing for synchronization can be decreased, timing accuracy for detecting the frequency estimating signal is improved, more reliable synchronization is established and good extensibility of timing extraction to three or more frames is obtained.

Moreover, since the probability of an error in estimating frequencies can be decreased by making an estimate of the frequency by synthesizing one candidate frequency estimated based on the frequency estimating signal obtained from the above two frames and the other candidate frequency estimated based on the frequency estimating signal obtained from the frame following the above two frames and then by performing the synchronization processing based on the estimated frequencies, the accuracy of estimating frequencies can be more improved compared with that in the signal receiving synchronization method disclosed in the above European Patent Application document.

Thus, when a frequency is estimated, if a shift in timing achieved by examining the correlation is taken into account, the accuracy of estimating the frequency can be further improved.

Furthermore, since whether the synchronization can be established or not is judged by examining the correlation between synchronization words after such advantageous processing has been complete, more reliable signal receiving synchronization can be achieved.

Second Embodiment

Figure 9:
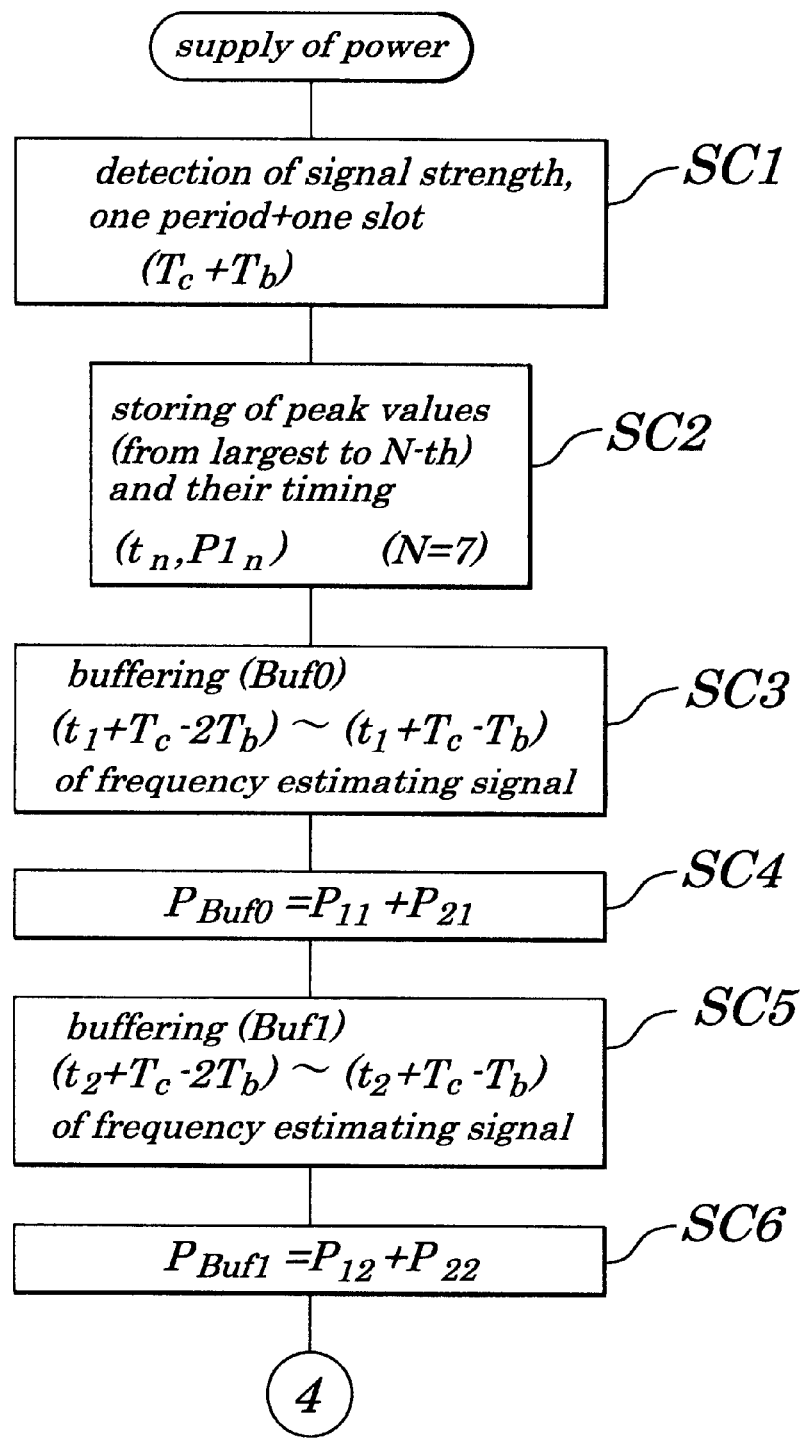
FIG. 9 is a first flowchart obtained by splitting a detailed flowchart into three parts for carrying out procedures of signal receiving synchronization in the signal receiving synchronization apparatus of a second embodiment.
Figure 10:
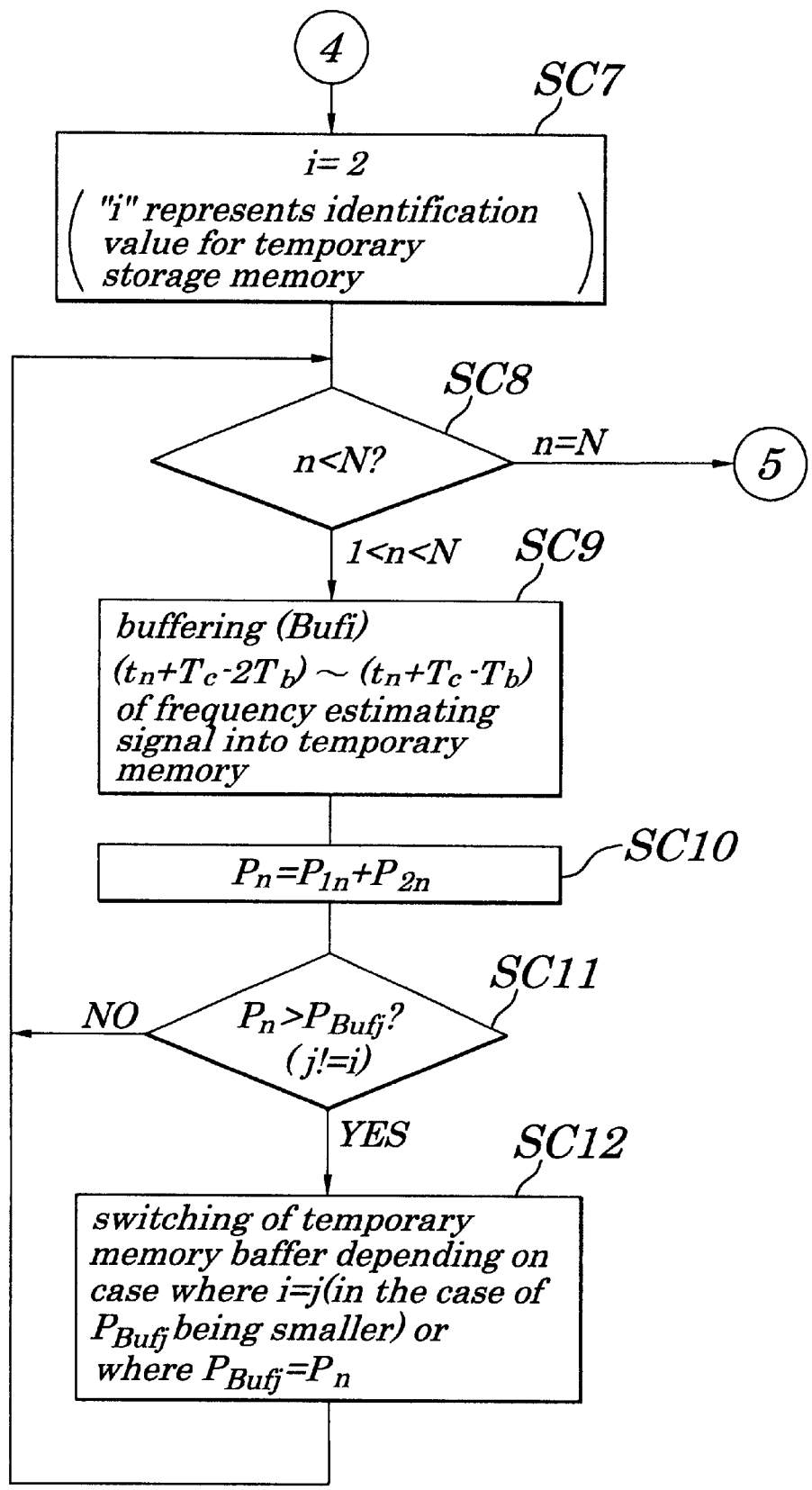
FIG. 10 is a second flowchart obtained by splitting the detailed flowchart into three parts for carrying out procedures of signal receiving synchronization in the signal receiving synchronization apparatus of the second embodiment.
Figure 11:
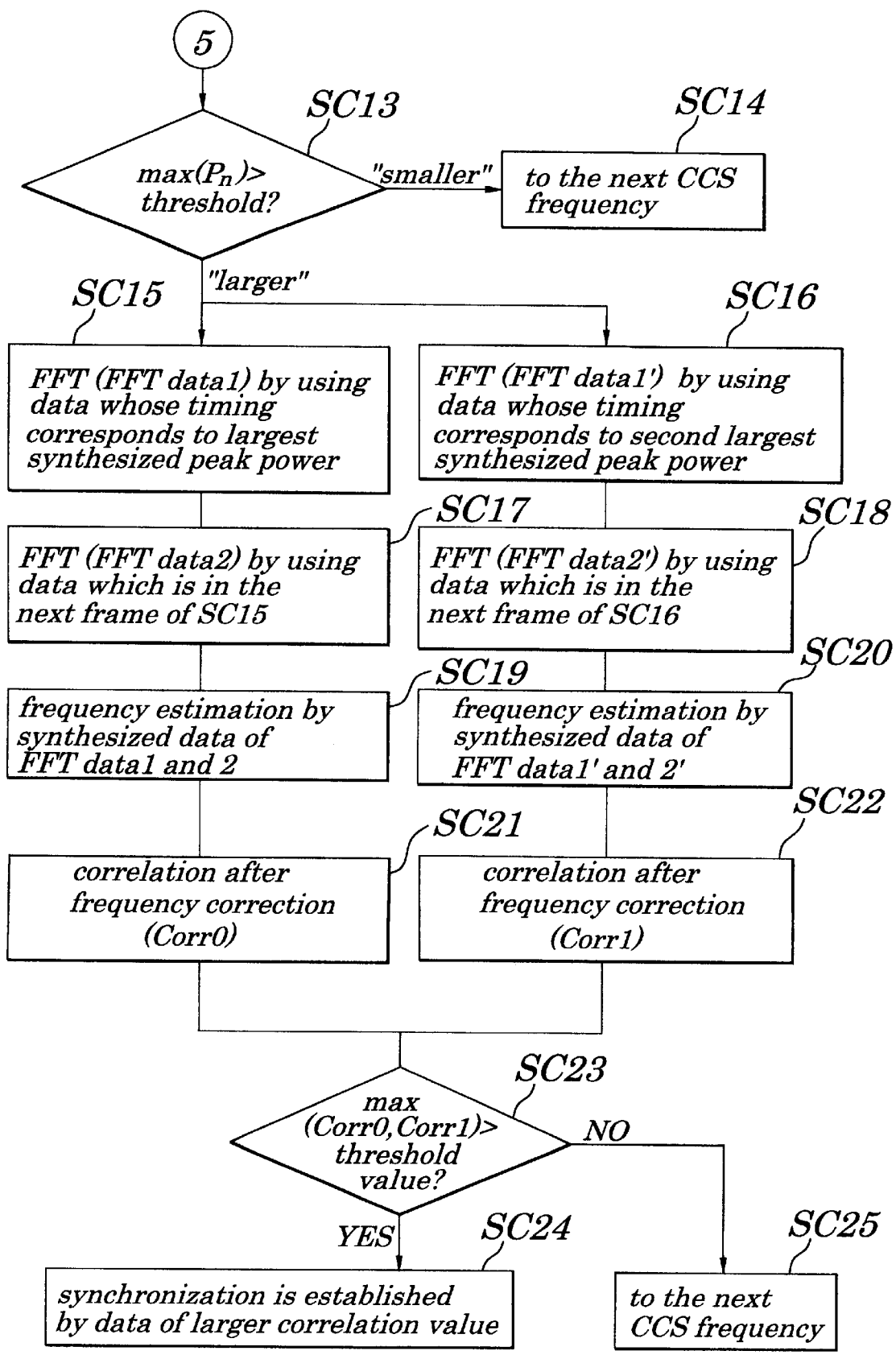
FIG. 11 is a third flowchart obtained by splitting the detailed flowchart into three parts for carrying out procedures of signal receiving synchronization in the signal receiving synchronization apparatus of the second embodiment.
Figure 12:
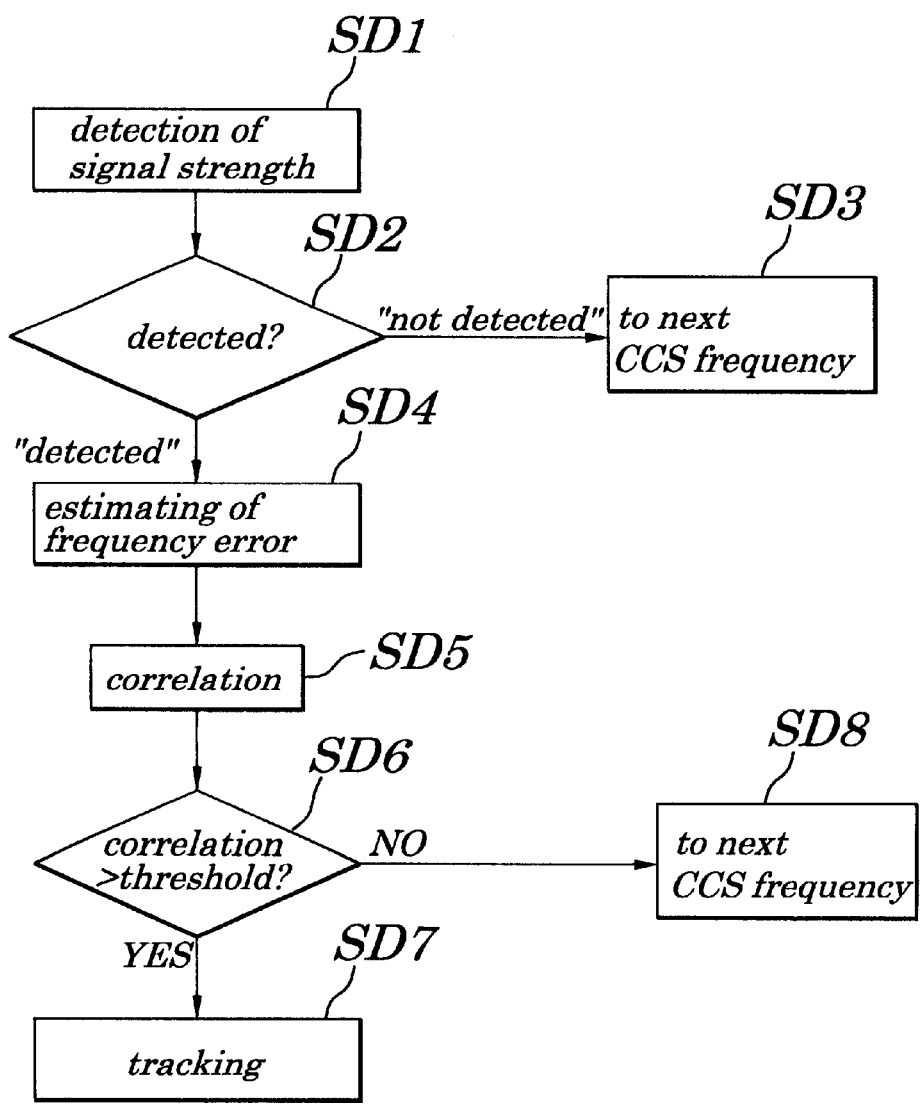
FIG. 12 is a detailed flowchart for carrying out signal receiving synchronization procedures according to a conventional signal receiving synchronization method.

FIG. 9 is a first flowchart obtained by splitting a detailed flowchart into three parts for carrying out procedures of signal receiving synchronization in the signal receiving synchronization apparatus of a second embodiment. FIG. 10 is a second flowchart obtained by splitting the detailed flowchart into three parts for carrying out procedures of signal receiving synchronization in the signal receiving synchronization apparatus of the second embodiment. FIG. 11 is a third flowchart obtained by splitting the detailed flowchart into three parts for carrying out procedures of signal receiving synchronization in the signal receiving synchronization apparatus of the second embodiment.

Configurations of this second embodiment differ from those of the first embodiment in the following three points. The first point is that, in the first embodiment, the rough timing used to extract the frequency estimating signal is obtained by getting a candidate of only one largest synthesized peak value in the first and second frames of the control signal, while, in the second embodiment, the rough timing is obtained by getting two candidates for the largest synthesized peak value and the next largest synthesized peak value in the first and second frames. The second point is that, in the second embodiment, when the obtained largest peak value is larger than the threshold value, the frequency is first estimated using the largest synthesized peak value and the next largest synthesized peak value to obtain two kinds of estimated frequency error data (hereinafter referred to as FFT data 1 and FFT data 1') and that, in the second frame and the subsequent third frame, the same FFT-conversion as used in the first embodiment is performed on a peak value (frequency estimating signal), in a third frame, corresponding to the above largest synthesized peak value and the next largest synthesized peak value to obtain two kinds of estimated frequency error data (hereinafter referred to FFT data 2 and FFT data 2') and that a first frequency error is to be estimated by synthesizing the FFT data 1 and FFT data 2' and a second frequency error is to be estimated by synthesizing the FFT data 1' and FFT data 2'. The third point is that, in the second embodiment, the frequency of the synchronization word contained in the CCS signal in the third frame is corrected using the above two kinds of estimated frequency error data and the correlation is examined between corrected synchronization words and those (synchronization words known to the signal receiver) of the signal sent through the control channel set by the signal receiving synchronization apparatus. When the larger correlation value out of both correlation values is larger than the threshold value, the synchronization is established by considering the time point when the larger correlation value is shown to be a timing which is matched to the timing of the signals given by the signal sender.

FIGS. 9 to 11 show details of procedures for carrying out these three points described above. Configurations described in the above first point are hereinafter described by referring to the flowchart shown in FIGS. 9 to 11. That is, three buffers Buf0, Buf1 and Buf2 are provided. At Step SC3 in FIG. 9, a first peak value obtained in the first frame is stored in the buffer Buf0 of the memory 16 and, at Step SC4, a first synthesized peak value is thus obtained. At Step SC5, a second peak value obtained in the second frame is stored into the buffer Buf1 of the memory 16 and a second synthesized peak value can be thus obtained.

At Step SC7, when i=2 (i.e., when "i" is set to 2), a third peak value obtained in the second frame is stored in the buffer Buf2 and, at Step SC9, when the processing enters the first processing loop of the processing composed of Steps SC7 to SC12, the third peak value obtained in the second frame is stored in the buffer Buf2. At Step SC10, the third peak value obtained in the second frame stored at Step SC9 and the third peak value obtained in the first frame are synthesized to obtain a third synthesized peak value.

At Step SC11, the third synthesized peak value is compared with the first and second synthesized peak values ("j!=i" shows that "j" is a value other than "i") and, if the third synthesized peak value is smaller than either of the synthesized peak values (in the case of NO at Step SC11), the step returns to its first processing loop. However, if the third synthesized peak value is larger than either of the synthesized peak values, the buffer storing a synthesized minimum peak value out of the first to third synthesized peak values is used as a temporary buffer for storing the synthesized peak value in the subsequent loop processing at Step SC12.

At Step SC12, the temporary buffer is switched depending on whether i=j (in the case of $P_{Bufj}$ being smaller) or $P_{Bufj}$=Pn. For example, in a state where the largest synthesized peak value is stored in the buffer Buf0 and the next largest synthesized peak value is stored in the buffer Buf1 and where n-th synthesized peak value in the second frame is stored in the buffer Buf2 in the previous processing loop, if Pn is larger than $P_{Buf1}$, each of the temporary buffers is so switched that the largest synthesized peak value is stored in the buffer Buf0 and the next largest synthesized peak value in the buffer Buf2 and (n+1)-th synthesized peak value in the buffer Buf1 in the next processing loop, while, if Pn is larger than $P_{Buf0}$, each of the buffers is so switched that the largest synthesized peak value is stored in the buffer Buf2, the next largest synthesized peak value is stored in the buffer Buf0 and, in the subsequent processing loop, (n+1)-th synthesized peak value is stored in the buffer Buf1.

Configurations described in the above second point are hereinafter described also by referring to the flowchart shown in FIGS. 9 to 11. At Step SC13, after the largest synthesized peak value and the next largest synthesized peak value out of n-pieces of synthesized peak values are stored as candidates in two buffers decided by the processing of the above switching, when the largest peak value is larger than the predetermined threshold value, the estimating of the frequency error begins. Processing at Steps SC15, SC17 and SC19 is performed to make an estimate of frequency errors in the largest synthesized peak value. That is, after the frequency error data (FFT data 1) is obtained by the FFT-conversion of the frequency estimating signal contained in the buffer storing the peak value being equivalent to the largest synthesized peak value (at Step SC15), the frequency error data (FFT data 2) is obtained by the FFT-conversion of the frequency estimating signal contained in the buffer storing the peak value corresponding to the above largest synthesized peak value in the third frame (at Step SC17). After that, the FFT data 1 and FFT data 2 are synthesized and the first frequency error is estimated (Step SC19).

Moreover, after the frequency error data (FFT data 1') is obtained by the FFT-conversion of the frequency estimating signal contained in the buffer storing the peak value corresponding to the next larger synthesized peak value of the largest synthesized peak value (at Step SC16) and the frequency error data (FFT data 1') is obtained by the FFT-conversion of the frequency estimating signal contained in the buffer storing the peak value corresponding to the next larger synthesized peak value of the largest synthesized peak value in the third frame (at Step SC18). After that, the FFT data 1' and FFT data 2' are synthesized to estimate the second frequency error (Step SC20).

Configurations described in the above third point are hereinafter described also by referring to the flowchart shown in FIGS. 9 to 11.

At Step SC21, synchronization words contained in the CCS signal in the subsequent frame are corrected using the first frequency error estimated at Step SC19 and the correlation is examined between synchronization words corrected and synchronization words (those known to the signal receiver) contained in a control signal to be sent through the control channel set by the signal receiving synchronization apparatus over a predetermined range of signals to obtain a correlation value Corr0 (Step SC21).

At Step SC22, synchronization words contained in the CCS signal in the subsequent frame are corrected using the first frequency error estimated at Step SC20 and the correlation is examined between synchronization words corrected and synchronization words (those known to the signal receiver) of the control signals to be sent through the control channel set by the signal receiving synchronization apparatus over a predetermined range of signals to obtain a correlation value Corr1 (Step SC22).

If the large correlation value obtained at Steps SC21 and SC22 is larger than the predetermined threshold value (in the case of "Large correlation value" at Step SC23), the synchronization is established (Step SC24).

Moreover, configurations of the signal receiving synchronization apparatus of this second embodiment are the same as those of the first embodiment.

Signal receiving synchronization procedures shown in the flowcharts in FIGS. 9 to 11 are stored in a ROM (Read Only Memory) constituting a digital signal processor 28, which are read from the ROM and fed to a memory (RAM) (Random Access Memory) of the digital signal processor 28 and are performed by the same, to carry out each of processing for the signal receiving synchronization by the signal intensity detecting section 15, the signal detection judging section 18, the timing estimating section 19, the signal extracting section 20, the frequency error estimating section 22, the signal extracting and frequency correcting section 23, the synchronization word correlation section 25, the signal detection judging section 26 and the timing estimating section 27.

The processing of the step SC1 in FIG. 9 is performed by the signal intensity detecting section 15 in FIG. 1. The processing of the step SC2 is performed by the memory 16 and the timing estimating section 19 in FIG. 1. The processing of the step SC3 and SC5 in FIG. 9 and the step SC9 in FIG. 10 is carried out by the signal extracting section 20 and the memory 21 in FIG. 1. The processing of the steps SC4 and SC6 in FIG. 9 and the step SC10 in FIG. 10 is carried out by the signal intensity detecting section 15 and the memory 16 in FIG. 1. The processing of the steps SC7, SC8, SC11 and SC12 in FIG. 10 is carried out by the memory 21 in FIG. 1. The processing of the step SC13 in FIG. 11 is performed by the signal detection judging section 18 in FIG. 1. The processing of steps SC15 to SC20 in FIG. 11 is carried out by the memory 21 and the frequency error estimating section 22 in FIG. 1. The processing of steps SC21 and SC22 in FIG. 11 is carried out by the signal extracting and frequency correcting section 23, the memory 24, the synchronization word correlation section 25 and the timing estimating section 27 in FIG. 1. The processing of the step SC23 in FIG. 11 is carried out by the signal detection judging section 26 in FIG. 1. The processing of steps SC14 and SC25 is performed by the CPU 32 and the frequency synthesizer 12 in FIG. 1.

Next, processing operations of this embodiment are described by referring to FIGS. 1, 2 and 7 to 11.

According to the second embodiment, in the same manner as for the first embodiment, digital signals are fed from the antenna and RF circuit 11, then through the down converter 13 and the A/D conversion circuit 14 to the digital signal processor 28.

Also, according to the second embodiment, in the same manner as for the first embodiment, peak values including values from the largest peak value to the N-th peak value, out of peak values of signals obtained by taking a moving average of peak values of levels of digital signals inputted in the digital signal processor 28 by moving a window (not shown in FIG. 7) having a predetermined length in a first frame (i.e., a period 50 shown by the reference number 2 in FIG. 7) constituting the above digital signal, are obtained by the signal intensity detecting section 15, and these peak values and their timing values, are stored in time sequence in the buffer BufA of the memory 16 (Steps SC1 and SC2 in FIG. 9). In the following description, for example, N is set to 7.

When the operation goes to the processing on the second frame (i.e., a period 51 shown by the reference number 2 in FIG. 7), the timing estimating section 19 is adapted to sequentially read contents of the buffer BufA of the memory 16 from its head and to feed them to the signal extracting section 20. The signal extracting section 20 is used to extract, using first and second timing values, the peak value in the second frame corresponding to these timing values, to synthesize the extracted peak value and the corresponding peak value in the first frame and to store them into the buffers Buf0 and Buf1 of the memory 21 (at Steps SC3 to SC6).

The third synthesized peak value in the second frame is stored in the buffer Buf2 of the memory 16 (Step SC10). Then, the third synthesized peak value is compared with the first and second synthesized peak values and, if the third synthesized peak value is smaller than any of the first and second synthesized peak values (in the case of NO at Step SC11), the operation returns back to the first step of the processing loop. If the third synthesized peak value is larger than any of the first and second synthesized peak values (in the case of YES at Step SC11), the fourth synthesized peak value, with the largest peak value and the next largest peak value out of the first to the third synthesized peak values being left in the buffer Buf2, is stored into the buffer in which the smallest synthesized peak value is stored.

The buffer is switched at Step SC12 in a manner that, when $P_{Buf0} > P_{Buf2} > P_{Buf1}$ as described above, the largest synthesized peak value and the next largest synthesized peak value are left in the buffers Buf0 and Buf2 as they are, a synthesized peak value obtained by the next timing value can be stored in the buffer Buf1.

The switching is performed on the buffer for storing the fourth peak value to the buffer for storing the seventh peak value. When N>7 (at Step SC8), two candidates for the largest synthesized peak value and the next largest synthesized peak value are stored in a period Tc being observed in two of the buffers Buf0, Buf1 and Buf2.

When the largest synthesized peak value is smaller than the threshold value (i.e., in the case of "Smaller" at Step SC13), the CCS signal is searched based on the frequency next to the frequency assigned to the control channel (at Step SC14).

When the largest synthesized peak value is larger than the threshold value (in the case of "Larger" at Step SC13), the first frequency error data (FFT data 1) and the second frequency error data (FFT data 1') are obtained by the FFT-conversion of the largest synthesized peak value and the next largest synthesized peak value stored in the buffers respectively (Steps SC15 and SC16), and third frequency error data (FFT data 2) and fourth frequency error data (FFT data 2') are obtained by the FFT-conversion of the peak value during a period following an observation period according to the timing of the data (Steps SC17 and SC18). Then, by synthesizing the FFT data 1 and FFT data 2, the estimated first frequency error is obtained (at Step SC19) and by synthesizing the FFT data 1' and FFT data 2', an estimated second frequency error is obtained (at Step SC20).

The correlation values Corr0 and Corr1 are examined between a synchronization word obtained by correcting a frequency of the synchronization word (in a period 55 shown by the reference number 4 in FIG. 7) written in the memory 24 according to the estimated first frequency error and the estimated second frequency error (i.e., synchronization word following a peak value after the observation period Tc from a timing point of the largest synthesized peak value and the next largest synthesized peak value word and a synchronization word of the control channel set by the signal receiving synchronization apparatus (i.e., the synchronization word known to the signal receiver) over a predetermined period (i.e., a period "a" in FIG. 8) at Steps SC21 and SC22.

If the larger correlation value out of these two correlation values Corr0 and Corr1 is larger than the threshold value (in the case of "Large correlation value" at Step SC23), synchronization is established (Step SC24). Once the synchronization has been established, the signal extracting and frequency correcting section 29 is adapted to extract control data in the CCS signal (in a period 55 shown by the reference number 4 in FIG. 7) contained in a slot 2 existing Tc after a slot next to a slot shown by a timing signal outputted from the timing estimating section 19 and the frequency of the controlling data contained in the CCS signal extracted using a frequency error supplied by the frequency error estimating section 22 is corrected and the data with the frequency corrected is outputted. The demodulator 30 is used to demodulate the controlling data outputted from the signal extracting and frequency correcting section. Moreover, if the larger correlation value out of two correlation values Corr0 and Corr1 is smaller than the threshold value (i.e., in the case of "Small correlation value"), the CCS signal is searched based on a frequency next to the frequency assigned to the control channel (Step SC25).

Thus, according to this second embodiment, since the timing used to extract candidates for a frequency estimating signal is provided by synthesizing peak values which correspond to each other, out of peak values obtained by taking the moving average of the peak values between two frames and by extracting the frequency estimating signal using the largest synthesized peak value and the next largest synthesized peak value, memory capacity required to obtain the timing can be decreased, timing accuracy for detecting the frequency estimating signal is improved, more reliable synchronization is established and good extensibility of timing extraction up to three or more frames is obtained.

Moreover, since a probability of an error in estimating frequencies can be decreased by synthesizing frequency data of a candidate for a frequency estimated based on two frequency estimating signals obtained from two frames of the control signal and frequency data of a candidate for a frequency estimated based on frequency estimating signals corresponding, in terms of time, to a candidate for two frequency estimating signals in a frame following the two frames in order to estimate the frequency error and further by performing the processing of synchronization based on the estimated frequency error, the accuracy of estimating frequencies required can be more improved compared with that in the signal receiving synchronization method disclosed in the above European Patent Application document.

Thus, since whether synchronization can be established or not is judged after having performed the effective processing and examined the correlation between synchronization words, the signal receiving synchronization can be achieved more reliably.

It is apparent that the present invention is not limited to the above embodiments but may be changed and modified without departing from the scope and spirit of the invention. For example, the number of the measurements of signal strength may be increased or decreased depending on the C/N ratio. The threshold value to the correlation value may be changed depending on the estimated C/N ratio. By the processing described above, the time required for synchronization may be shortened. Moreover, the signal extracting and frequency correcting section 23 may be so configured that it is divided into a first signal extracting section and a first frequency correcting section and the memory 24 may be disposed between the first signal extracting section and the first frequency correcting section. In the first signal extracting section having this configuration, the signal fed from the A/D conversion circuit 14 is extracted by the timing value from the timing estimating section and stored into the memory, the frequency of the signal is corrected using the frequency error obtained by the frequency error estimating section 22. Also, the signal extracting and frequency correcting section 23 may be so configured that it is divided into a second signal extracting section and a second frequency correcting section. In the second signal extracting section having this configuration, the signal fed by the A/D conversion circuit 14 is extracted by the timing defined by rough timing provided by the timing estimating section 19 and fine timing provided by the timing estimating section 27 and, in the second frequency correction section, the frequency of extracted signals is corrected by the frequency error obtained by the frequency error estimating section 22.

As described above, according to the configurations of the present invention, since the timing extraction for the frequency estimating signal can be obtained based on the largest synthesized peak value and the next largest synthesized peak value, the memory capacity required to obtain the timing can be decreased, timing accuracy for detecting the frequency estimating signal is improved, more reliable synchronization is established and good extensibility of timing extraction up to three or more frames can be obtained.

Moreover, since the probability of an error in estimating frequencies can be decreased by making an estimate by synthesizing one or two candidate frequencies estimated based on one or two frequency estimating signals obtained from the above two frames and one or two candidate frequencies estimated based on the frequency estimating signal obtained from the frame following the above two frames and then by performing the synchronization processing based on the frequencies estimated as above, the accuracy of estimating frequencies can be improved.

The accuracy of estimating the frequency can be further improved by taking into account a shift in timing achieved by examining the correlation, the accuracy of estimating the frequency can be further improved when the frequency is estimated by synthesizing one candidate frequency and the other candidate frequency estimated based on the frequency estimating signal obtained in a frame following the above two frames.

Thus, since, whether synchronization can be established or not is judged after having performed the effective processing and after having examined the correlation between synchronization words, the signal receiving synchronization can be achieved more reliably.

Finally, the present application claims the priority based on Japanese Patent Application No. Hei11-022319 filed on Jan. 29, 1999, which is herein incorporated by reference.

What is claimed is:

1. A signal receiving synchronization method for establishing synchronization between a signal sender and a signal receiver based on a frequency estimating signal detected based on a predetermined number of peak values, in each frame of a control signal containing said frequency estimating signal and a synchronization word, obtained by taking a moving average of a train of said control signals sent from said signal sender to said signal receiver and based on said synchronization word detected following said frequency estimating signal, said method comprising steps of:

synthesizing peak values corresponding to each other in two frames in said control signal; and detecting said frequency estimating signal based on a largest synthesized peak value out of synthesized peak values.

2. The signal receiving synchronization method according to claim 1, further comprising steps of:

detecting a candidate for said frequency estimating signal based on said largest synthesized peak value obtained by synthesizing peak values in said two frames; and detecting, based on said candidate for said frequency estimating signal, said frequency estimating signal corresponding to a candidate for said frequency estimating signal in a third frame existing after said two frames.

3. The signal receiving synchronization method according to claim 2, wherein said candidate for said frequency estimating signal corresponding to said largest synthesized peak value in said third frame existing after said two frames of said control signal is detected by taking into account an amount of a shift in timing obtained by calculation of a correlation value in said third frame existing after said two frames if said correlation value between a detected synchronization word with its frequency corrected using an estimated receiving frequency error and a synchronization word set by a signal receiving synchronization apparatus and being known to said signal receiver is larger than a threshold value and by not taking into account the amount of a shift in the timing obtained by calculation of said correlation in said third frame existing after said two frames if said correlation value is smaller than the threshold value.

4. The signal receiving synchronization method according to claim 1, wherein said peak value is smaller than said largest peak value and said next largest peak value obtained in a frame of said control signal and is a peak value obtained in a predetermined order from said largest peak value.

5. A signal receiving synchronization method for establishing synchronization between a signal sender and a signal receiver based on a frequency estimating signal detected based on a predetermined number of peak values, in each frame in a control signal containing said frequency estimating signal and a synchronization word, obtained by taking a moving average of a train of said control signals sent from said signal sender to said signal receiver and based on a synchronization word detected following said frequency estimating signal, said method comprising steps of:

detecting a largest synthesized peak value and a next largest peak value out of synthesized peak values obtained by synthesizing peak values, corresponding to each other, obtained in two frames in said control signal, detecting said frequency estimating signal for said largest synthesized peak value detected and said next largest synthesized peak value detected, and establishing synchronization between said signal sender and said signal receiver based on two frequency estimating signals detected and said synchronization word to be detected following two frequency estimating signals detected.

6. The signal receiving synchronization method according to claim 5, further comprising steps of:

detecting, based on peak values corresponding to a largest synthesized peak value and a next largest synthesized peak value obtained in the third frame existing after said two frames in said control signal, said frequency estimating signals corresponding to each of said both synthesized peak values; and establishing synchronization between said sender and said receiver based on each of frequency estimating signals detected and said synchronization word to be detected following said frequency estimating signal detected in the third frame existing after said two frames in said control signal.

7. The signal receiving synchronization method according to claim 5, wherein said peak value is smaller than said largest peak value and said next largest peak value obtained in a frame of said control signal and is a peak value obtained in a predetermined order from said largest peak value.

8. A signal receiving synchronization apparatus for establishing synchronization between a signal sender and a signal receiver based on a frequency estimating signal detected based on a predetermined number of peak values, in each frame in a control signal containing said frequency estimating signal and a synchronization word, obtained by taking a moving average of a train of said control signals sent from said signal sender to said signal receiver and based on said synchronization word detected following said frequency estimating signal, said apparatus comprising:

synthesizing means for synthesizing peak values, corresponding to each other, obtained in two frames of said control signal; and detecting means for detecting said frequency estimating signal based on a largest synthesized peak value out of synthesized peak values synthesized by said synthesizing means.

9. The signal receiving synchronization apparatus according to claim 8, further comprising;

first detecting means for detecting a candidate for a frequency estimating signal based on said largest synthesized peak value obtained in said two frames; and second detecting means for detecting said frequency estimating signal corresponding to a candidate for said frequency estimating signal obtained in a third frame existing after said two frames based on a candidate for said frequency estimating signal detected by said first detecting means.

10. The signal receiving synchronization apparatus according to claim 9, wherein said first detecting means is comprised of estimating means for a receiving frequency error based on said largest synthesized peak value detected in said two frames and candidate detecting means for detecting a candidate for said frequency estimating signal, if said correlation value between said detected synchronization word with its frequency corrected using said estimated receiving frequency error and said synchronization word set by said signal receiving synchronization apparatus and being known to said signal receiver is larger than a threshold value, by taking into account an amount of a shift in timing obtained by calculation of said correlation value in the third frame existing after said two frames and, if said correlation value is smaller than the threshold value, by not taking into account the amount of a shift in the timing obtained by calculation of said correlation in the third frame existing after said two frames.

11. The signal receiving synchronization apparatus according to claim 8, wherein said synthesizing means has a memory to store said peak value which is smaller than said largest peak value and said next largest peak value obtained in a frame in said control signal and which is a peak value obtained in the predetermined order from said largest peak value and wherein said synthesizing means is used to synthesize peak values stored in said memory and corresponding peak values obtained in a subsequent frame in said control signal.

12. The signal receiving synchronization apparatus according to claim 11, further comprising third detecting means for detecting said frequency estimating signals corresponding to each of both synthesized peak values detected in the third frame existing after said two frames based on the largest synthesized peak value and the next largest synthesized peak value obtained in the third frame existing after said two frames and synchronizing means for establishing synchronization based on each of frequency estimating signals detected by said third detecting means and synchronization words detected in said third frame following said frequency estimating signal.

13. The signal receiving synchronization apparatus according to claim 12, wherein said first detecting means is provided with a memory to store said peak value which is smaller than said largest peak value and said next largest peak value obtained in a frame of said control signal and which is a peak value obtained in a predetermined order from said largest peak value and wherein said synthesizing means is used to synthesize peak values stored in said memory and corresponding peak values in a frame subsequent to said frame in said control signal.

14. A signal receiving synchronization apparatus for establishing synchronization between a signal sender and a signal receiver based on a frequency estimating signal detected based on a predetermined number of peak values, in each frame in a control signal containing said frequency estimating signal and a synchronization word, obtained by taking a moving average of a train of said control signals sent from said signal sender to said signal receiver and based on said synchronization word detected following said frequency estimating signal, said apparatus comprising:

first detecting means for detecting a largest synthesized peak value and a next largest synthesized peak value out of peak values obtained by synthesizing peak values, corresponding to each other, in two frames in said control signal;

second detecting means for detecting said frequency estimating signals corresponding to each of said both synthesized peak values based on said largest synthesized peak value and said next largest synthesized peak value detected by said first detecting means; and synchronizing means for establishing synchronization based on two frequency estimating signals detected by said second detecting means and a synchronization word detected following said two frequency estimating signals.

15. The signal receiving synchronization apparatus according to claim 14, wherein said first detecting means is provided with a memory to store said peak value which is smaller than said largest peak value and said next largest peak value obtained in a frame of said control signal and which is a peak value obtained in a predetermined order from said largest peak value and wherein said synthesizing means is used to synthesize peak values stored in said memory and corresponding peak values in a frame subsequent to said frame in said control signal.

* * * * *